UNITED STATES PATENT OFFICE.

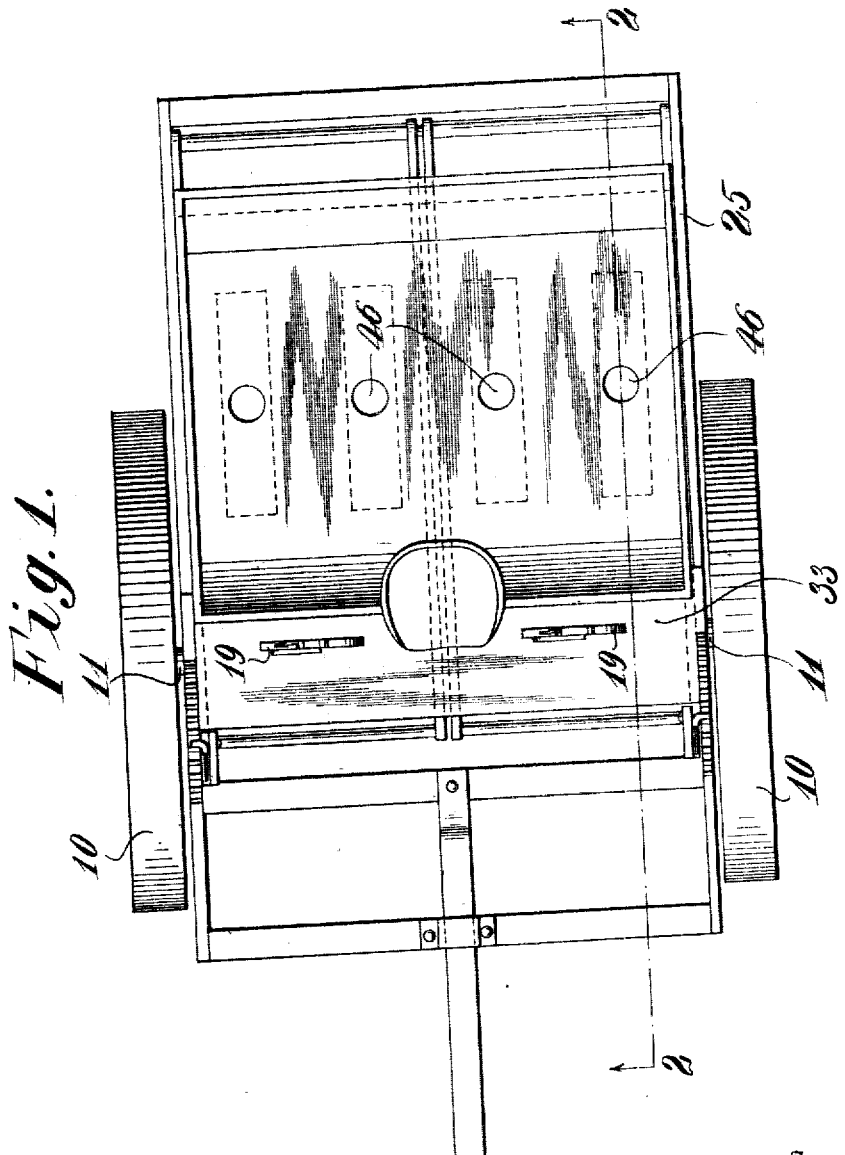

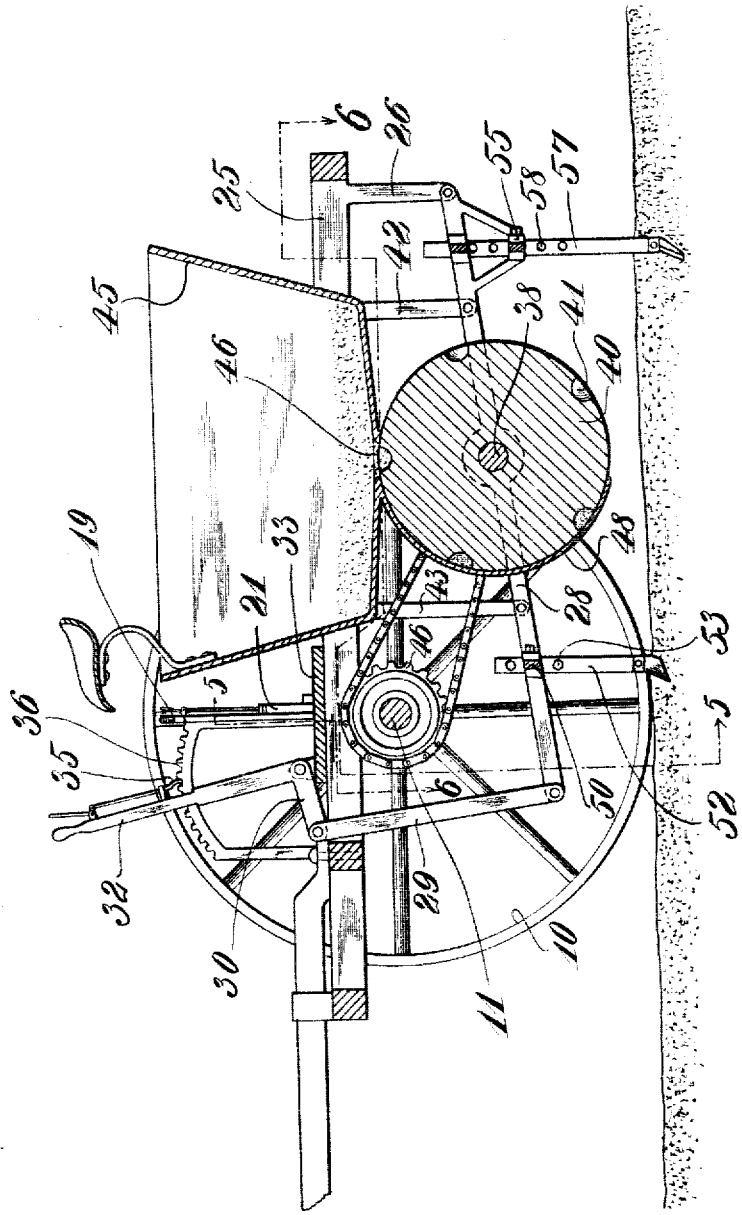

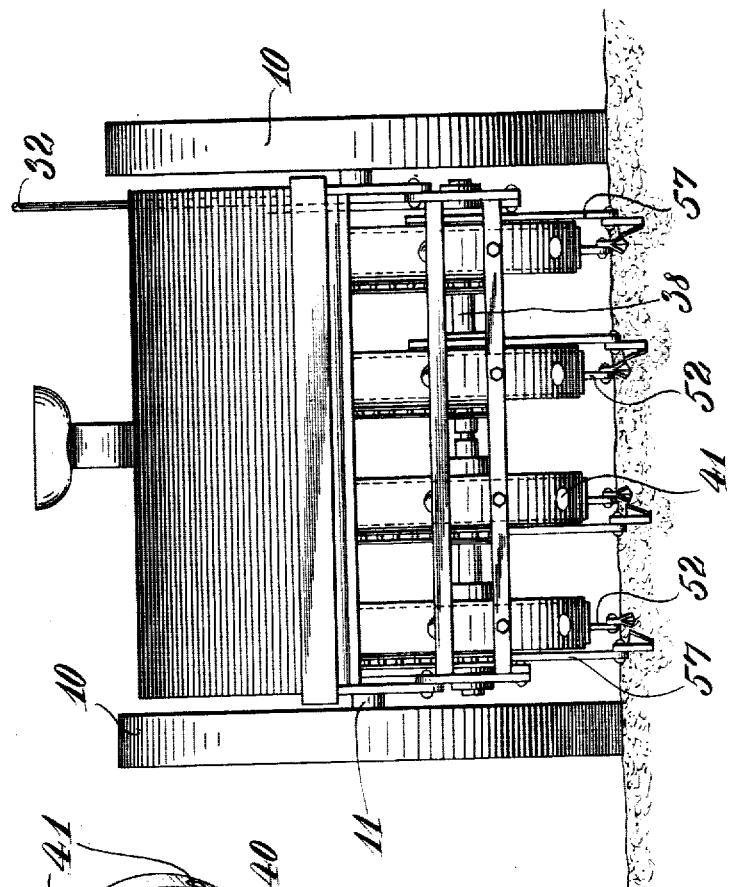
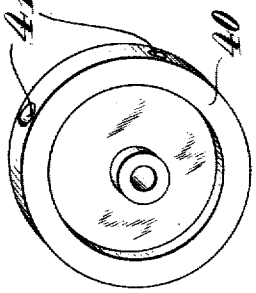

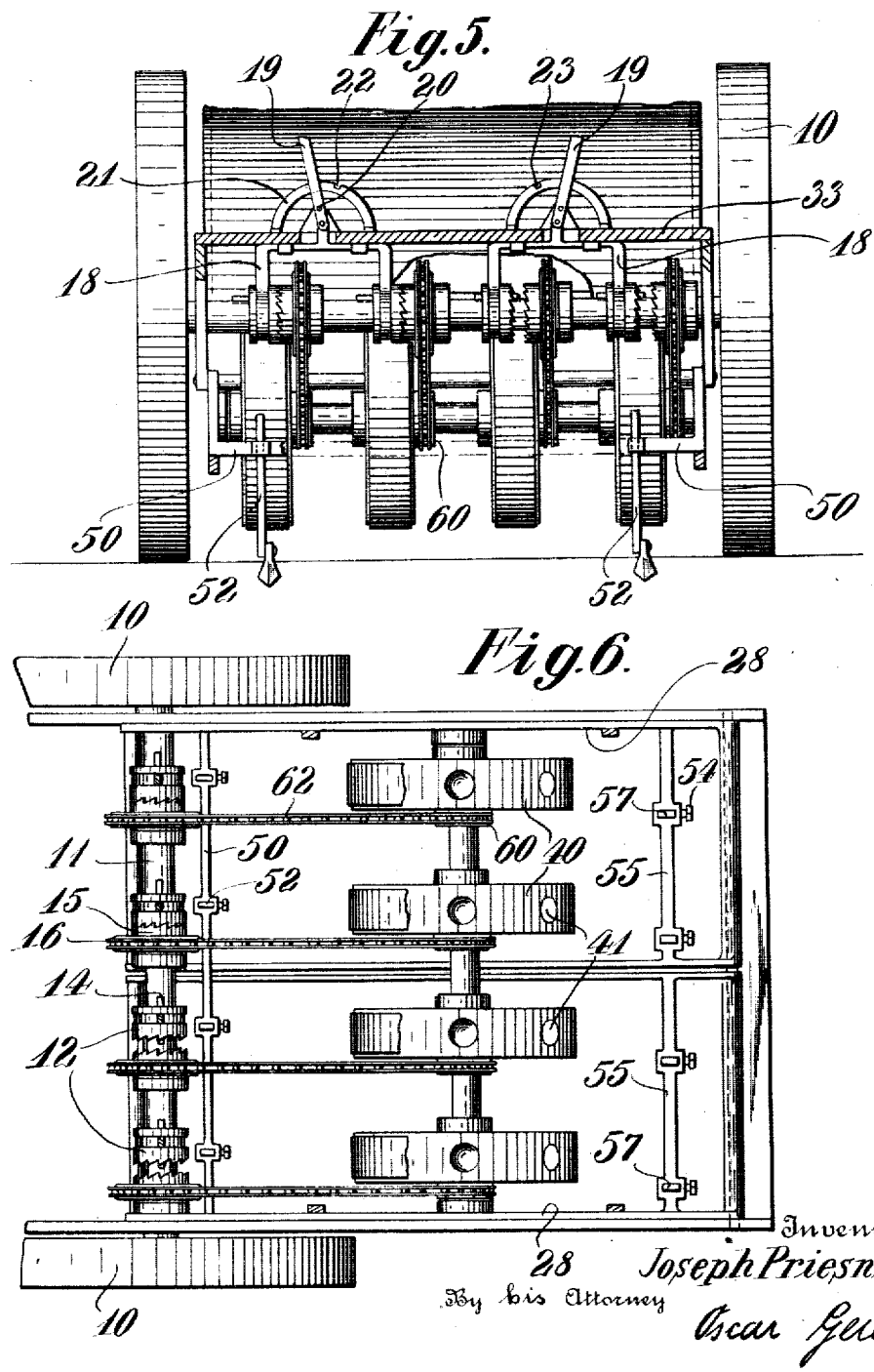

JOSEPH PRIESNITZ, OF OLMITZ, KANSAS.

PLANTER.

1,282,126.

Specification of Letters Patent.   Patented Oct. 22, 1918.

Application filed December 6, 1916.   Serial No. 135,335.

*To all whom it may concern:*

Be it known that I, JOSEPH PRIESNITZ, a citizen of the United States, resident of Olmitz, county of Barton, and State of Kansas, have invented certain new and useful Improvements in Planters, of which the following is a specification.

This invention relates to improvements in agricultural machines, particularly of the type known as seeders, and has as its principal object the provision of power driven machines which will apportion and deliver a predetermined number or quantity of seed at regular intervals.

A second object is to combine with such apparatus means for opening the rows preparatory to planting the seed therein, and to further provide means for covering the seed thus delivered.

These and other like objects are attained by the novel construction and combination of parts hereafter described and shown in the accompanying drawings, forming a material part of this specification, and in which:—

Figure 1 is a plan view of a planter made in accordance with the invention.

Fig. 2 is a vertical sectional view taken on line 2—2 of Fig. 1.

Fig. 3 is a rear end view of the same.

Fig. 4 is a perspective view showing one of the seed apportioning and delivering means.

Fig. 5 is a vertical sectional view taken on line 5—5 of Fig. 2, and

Fig. 6 is a horizontal sectional view taken on line 6—6 of Fig. 2.

The apparatus consists of a truck mounted upon wheels 10 arranged upon either side and having a central axle 11 rigidly engaged with the wheels in such manner as to revolve as the apparatus is drawn over the ground.

Mounted on the axle 11 are a plurality of sliding clutch elements 12. the same being rotated by keys 14 fixed in the axle, the teeth of the clutches being engageable with similar oppositely disposed clutch elements 15 formed with the sprocket wheels 16 which are mounted freely on the axle and revolve when the clutches 12 engage with them, the clutches being operated in pairs through the yokes 18 actuated by the hand levers 19, fulcrumed upon pins 20 and held in an adjusted position by means of the sector 21, having openings 22 and 23 by which the position of the clutches may be determined.

The frame 25 of the machine is substantially rectangular in shape, and provided with rigid downwardly extending arms 26 at the rear, to which are hingedly engaged levers 28 connected through links 29, with the arm 30 of a hand lever 32, pivoted to the bracket 33 mounted transversely at the front part of the frame 25, the lever having a movable dog 35 engaging with teeth formed in a sector 36, so that as the handle 32 is operated the levers 28 may be raised or lowered and held in an adjusted position.

Carried by the levers 28 is a shaft 38 upon which are mounted a plurality of disks 40 having pockets or recesses 41 suited to contain a desired number or quantity of the seeds to be planted.

Mounted within the frame, upon supports 42 and 43 respectively at the rear and front of the machine and carried by the levers 28, is a reservoir 45 in which a quantity of the seeds, as corn or other grains may be contained, the reservoir having flaring sides and a concave bottom, through which are openings 46 registering laterally with the several disks 40 and formed with the lower or bottom element of the reservoir 45 is a semi-circular guard or casing 48 partially encircling the disks 40, preventing the seed from passing outwardly from the pockets 41 until the disks have rotated to such an extent as to pass the end of the casing 48, which is preferably at a point directly below the shaft 38.

Also attached to the levers 28, at the front of the machine, is a cross-bar 50 in which are formed spaced rectangular openings receptive of shanks of the plows or row openers 52 which are adjusted vertically by means of the pin holes 53 receptive of pins and held in position by the screws 54 so as to extend into the surface of the soil a desired depth.

Near the rear ends of the levers 28 a similar cross-bar 55 provided with openings by means of which the seed covering elements 57 may be secured, the same being similarly provided with pin holes 58 receptive of pins by which the depth of the covering plows may be adjusted.

Motion is communicated to the several disks 40 by means of sprockets 60, secured to their sides, chains 62 extending between the driving sprockets 16 and disk sprockets 60, as will best be seen in Fig. 6.

From the foregoing, it will be seen that as the machine is caused to advance over the surface and the wheels 10 rotated, rotary motion is transmitted from the axle 11 to the shaft 38, causing the disks to be rotated, provided the clutches are in engagement, and as the bottom of the reservoir 45 is open to the pockets 41 that each of the pockets will be successively filled as the disks rotate, carrying a predetermined quantity of seed therefrom past the end of the casing 48, whereupon the seed drops by gravity into the trenches prepared by the plows 52 and immediately thereafter is covered by soil thrown up by the coverers 57.

When it is desired to cease operations, the handles 19 are operated to throw the clutches out of engagement, whereby the disks cease rotating, thus preventing seed to pass from the reservoir.

When the machine is to be drawn along the highway, the lever 32 may be operated to raise the bars 28 upward together, with the plows, coverers, disks, and reservoir, so that the machine may be drawn along a roadway.

Having thus described my invention, what I claim as new, and desire to secure by Letters Patent, is:—

1. In a device as described, in combination, a truck frame having a pair of supporting wheels, an axle carrying said wheels, a substantially rectangular frame carried by said truck, a pair of rigid downwardly-extending arms formed upon opposite sides of said frame, a pair of levers hingedly mounted upon said depending arms at their outer ends, a bell-crank handle lever pivotally mounted upon said frame, a link pivotally connected to one leg of said bell-crank lever at one end and to the opposite end of the first lever at its opposite end, a rack secured alongside said handle lever, a latch carried by said handle lever engaging said rack, a transverse shaft mounted upon said first-named levers, a plurality of disks fixed upon the last-named shaft, and provided with a circumferential series of pockets, and a reservoir mounted upon the mentioned first-named levers and having openings disposed at its bottom adapted to register with the pockets of said disks to feed seed thereto.

2. In a device as described, in combination, a rectangular frame, an axle carried by said frame, a pair of wheels mounted upon said axle, a platform section secured upon the forward end of said frame, clutch gears mounted in pairs upon said axle, a pair of depending arms secured upon opposite sides at the rear end of said frame, a pair of longitudinal levers pivoted upon said depending arms, said clutch gears being loosely mounted upon said axle, sliding clutch elements associated with said clutch gears upon said axle, a transverse shaft mounted upon said levers, a separate disk fixed upon said last-named shaft, one for each clutch gear, gears adjacent each disk, drive chains trained upon said clutch gears and said last-named gear said platform being formed with a series of transversely arranged openings, guides dependingly secured under said platform, two for each pair of sliding clutch elements, yokes having base-portions sliding in said brackets and arms adapted to shift each pair of sliding clutch elements, an upstanding lug on each yoke projecting in one of said openings, an operating lever pivotally secured to each of said lugs, and means on said platform designed to lock said yokes in set position, means for adjustably supporting the free ends of said levers, each of said disks having circumferential pockets, and a seed feeding receptacle arranged to discharge seeds into any of said pockets.

3. In a device as described, in combination, a rectangular frame, an axle thereon carrying supporting wheels, a pair of depending arms secured at the rear end of said frame, a pair of slide levers pivotally secured upon said depending arms, a platform mounted upon said frame at its forward end, directly over said axle, a lug mounted upon one end of said platform, a bell-crank lever providing an operating handle at its upper arm and a link-operating arm at its lower end, a link connecting said lower end of said bell-crank lever and the free end of one of said levers, a link pivoted upon said frame and pivotally connected to the free end of the other lever, a seed distributing member carried by said levers, a cross-bar attached to said levers at the front of the machine, a cross-bar similarly secured at the rear end of said frame, each of said cross-bars being formed with a series of rectangular openings, a series of plow shanks disposed in said openings, each of said shanks being formed with vertical series of openings, and pins passing through any of the openings in said shanks as well as into said cross-bars.

In testimony whereof I have affixed my signature.

JOSEPH PRIESNITZ.

Copies of this patent may be obtained for five cents each, by addressing the "Commissioner of Patents, Washington, D. C."